Jan. 26, 1960 T. F. MASON 2,922,204
APPARATUS AND METHOD OF MAKING FABRIC COVERED
WEATHER STRIPS FOR VEHICLE DOORS AND PRODUCT
Filed Oct. 13, 1955 3 Sheets-Sheet 1
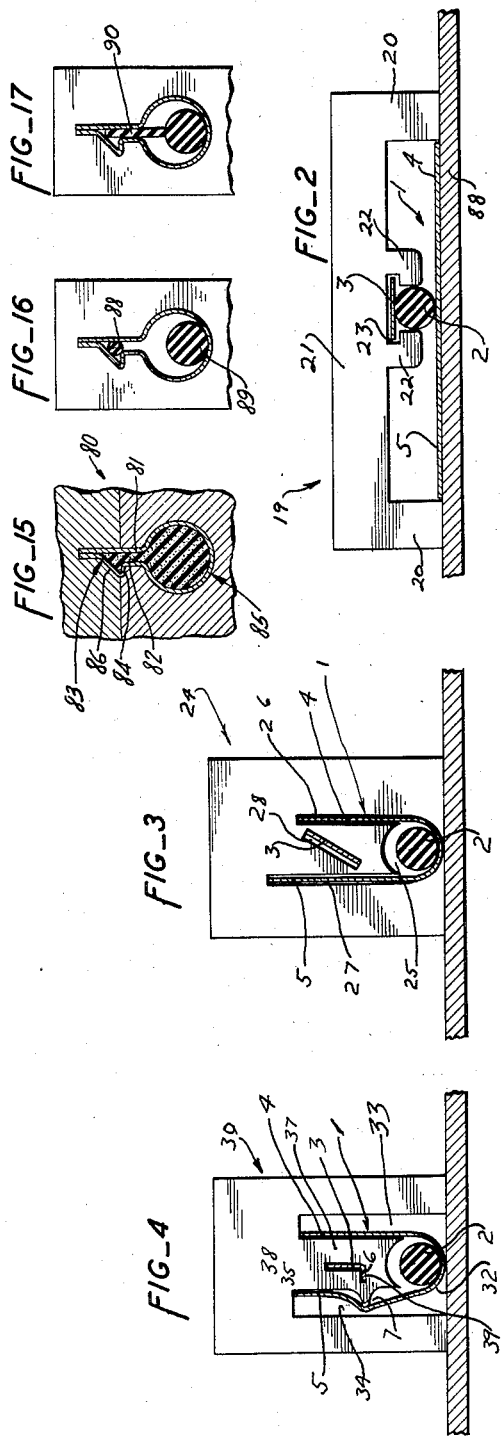
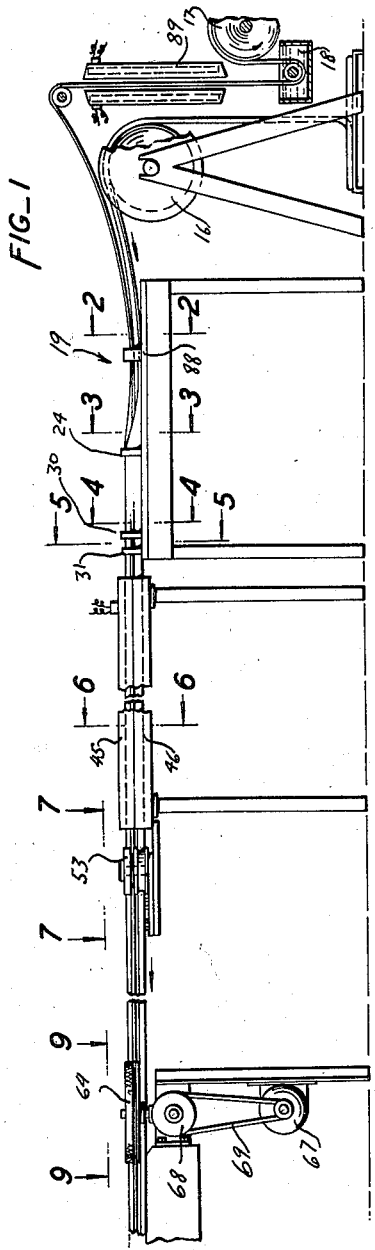
INVENTOR.
THOMAS F. MASON
BY
*Bayken, Mohler & Wood*
ATTORNEYS Jan. 26, 1960    T. F. MASON    2,922,204
APPARATUS AND METHOD OF MAKING FABRIC COVERED
WEATHER STRIPS FOR VEHICLE DOORS AND PRODUCT
Filed Oct. 13, 1955    3 Sheets-Sheet 2
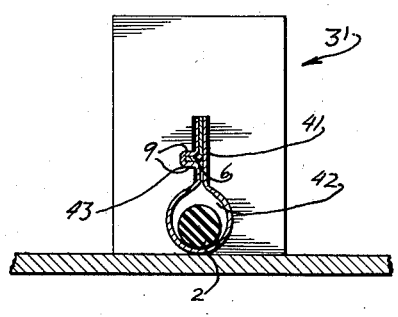
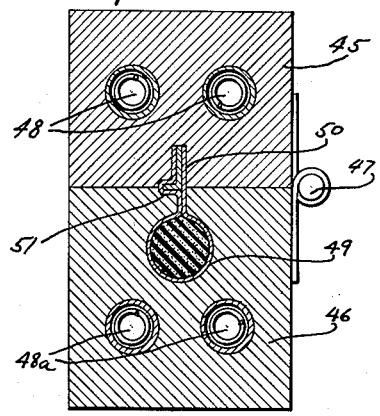
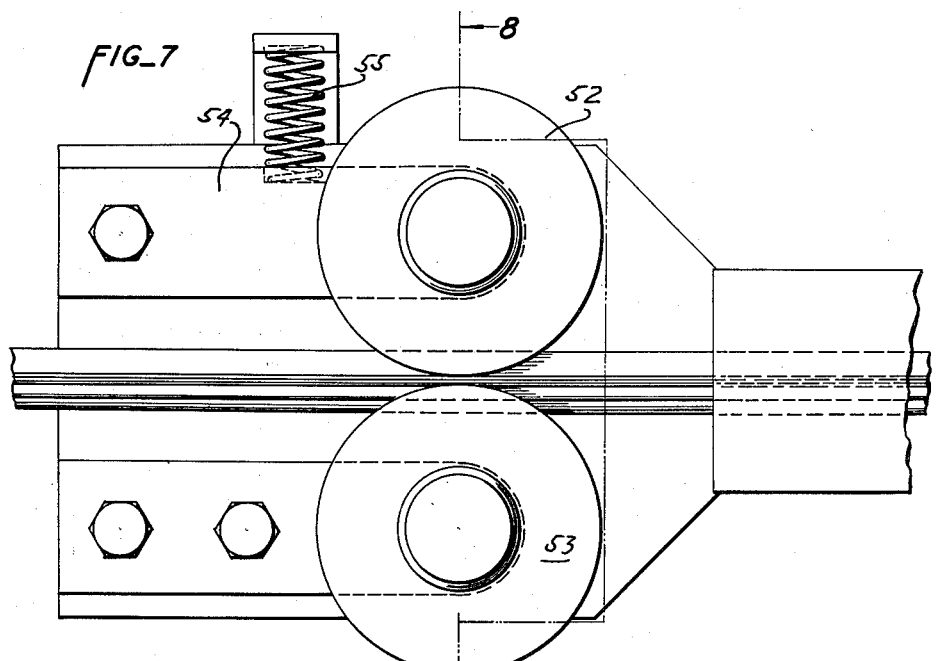
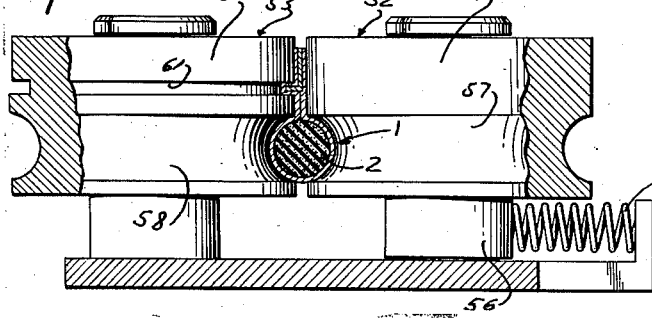
INVENTOR.
THOMAS F. MASON
BY
ATTORNEYS

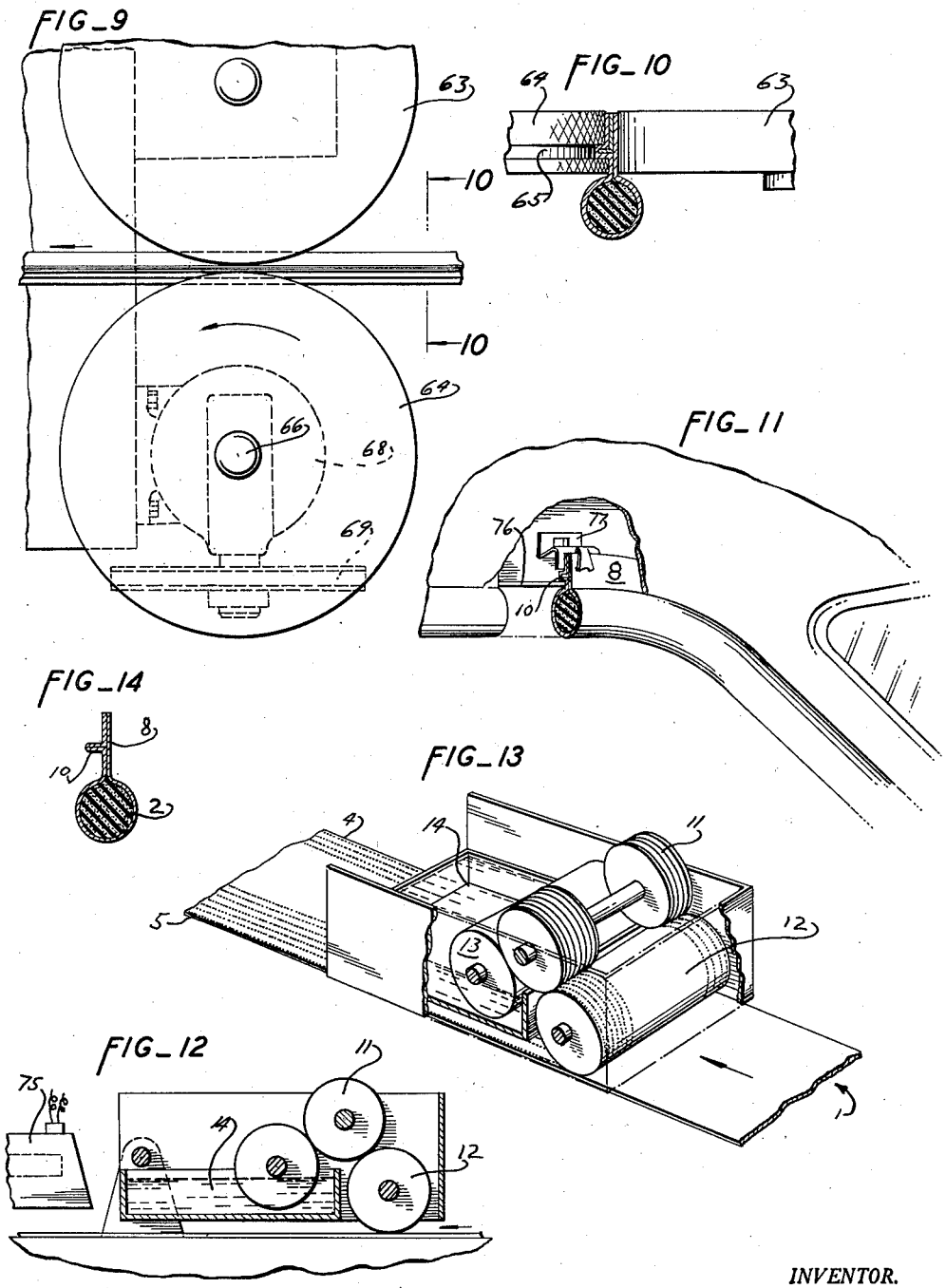

United States Patent Office 2,922,204
Patented Jan. 26, 1960

2,922,204

APPARATUS AND METHOD OF MAKING FABRIC COVERED WEATHER STRIPS FOR VEHICLE DOORS AND PRODUCT

Thomas F. Mason, Redwood City, Calif.

Application October 13, 1955, Serial No. 540,198

2 Claims. (Cl. 20—69)

This invention relates to weather strips, called "windlace" in the automotive industry, and has for one of its objects the provision of an improved method and apparatus for making continuous weather strips for vehicle doors and the like, in which a length of foam or sponge rubber is enclosed in an elongated fabric strip or tape that is provided with a flat tongue extending longitudinally of the length of said fabric and rubber projects from a side of the rubber, and which tongue is provided with a laterally projecting rib along one side, also extending longitudinally of the tape and rubber.

Heretofore, "wind lace," or a weather strip of the above character, has been relatively complicated and expensive to make and to handle. In several instances an elongated core of plastic sponge rubber has been enclosed within a tape of fabric and a strip of wire cloth or combinations of interwoven wire and fibrous cords have been sewed to extensions of the fabric tape with a portion of the wire cloth imbedded within the rubber. Other forms sew separate ridge members to extensions on the fabric tape that encloses the rubber. The wire cloth or combinations of wire interwove with fibrous cords or the like, have been employed to provide stiffness in the tongue that carries the laterally projecting rib. However, the step of stitching a rib to the wire reinforced tongue, or to a tongue of any structure, is costly and the resultant product is complicated and the sewed parts can become unstitched, and the employment of wire in the product is difficult to handle, costly and difficult to make.

One of the objects of the present invention is a product that is free from the above objections to the conventional products, and that is economical to make and one that requires no stitching nor the employment of metal or similar material.

Another object of the invention is the provision of an improved method of making the above product, and a still further object of the invention is the provision of a machine for making said product and for carrying out the steps of said method.

Briefly described, applicant's method comprises continuously laying a length of unvulcanized sponge rubber on one side of a fabric tape, and then progressively folding said tape around the sponge rubber so that the longitudinally extending marginal portions of the tape are in opposed relation projecting from one side of the length of rubber. The said marginal portions are then secured together along the free longitudinally extending edges of the tape, and one of said marginal portions is formed with a rib projecting laterally and substantially perpendicularly outwardly of and away from the other marginal portion. Thus the two marginal portions will form a tongue extending longitudinally of and radially outwardly of the length of rubber (the latter usually being generally cylindrical) and which tongue has a rib projecting laterally from one side thereof.

The opposed sides of the portion of the tape forming said tongue, including the part of one side from which said rib is formed, preferably have a plastic material between them, which material may to some degree or other impregnate or be adhered to the tape, and this material may not only constitute the medium that connects the marginal portions of the tape and that holds the rib in desired shape or cross sectional contour, but it gives sufficient stiffness to the tongue and to the rib to prevent the rib and tongue from being distorted in a manner that would interfere with the positioning of the finished "windlace" or weather strip on the body of an automobile. It is particularly important, however, that the rib be sufficiently strong to hook over a flange provided on the door frame and to hold to said flange with the assistance of conventional clips that engage the tongue along its free edges, yet sufficiently flexible to be worked into place.

The plastic for holding the opposed marginal portions of the tape together and for joining the rib and holding it to form, may be latex, or even sponge rubber itself, the latter being uncured when first placed between the opposed marginal portions of the tape and then binding with the fabric of the tape and swelling out to form the rib when said marginal portions are held in a suitable form.

Obviously a combination of a plastic solution and sponge rubber may be employed each being between different portions of the tape, or a fibrous plastic carrier may be positioned between the marginal portions of the tape to both carry the plastic to the tape and to stiffen the marginal portions when the plastic has set.

Other objects and advantages will appear in the description and in the drawings.

In the drawings,

Fig. 1 is an elevational view (broken in length to accommodate the sheet) showing a machine for making the product.

Fig. 2 is an enlarged sectional view taken along line 2—2 of Fig. 1.

Fig. 3 is an enlarged sectional view taken along line 3—3 of Fig. 1.

Fig. 4 is an enlarged sectional view taken along line 4—4 of Fig. 1.

Fig. 5 is an enlarged sectional view taken along line 5—5 of Fig. 1.

Fig. 6 is an enlarged sectional view taken along line 6—6 of Fig. 1.

Fig. 7 is an enlarged fragmentary plan view of part of the machine of Fig. 1 as seen from line 7—7 of Fig. 1.

Fig. 8 is a sectional view taken along line 8—8 of Fig. 7.

Fig. 9 is an enlarged, fragmentary plan view of part of the machine of Fig. 1 as seen from line 9—9 of Fig. 1.

Fig. 10 is a fragmentary, sectional view taken along line 10—10 of Fig. 9.

Fig. 11 is a fragmentary view of a portion of the body of a vehicle showing the weather strip (one end in cross section) being applied to said body around the door.

Fig. 12 is a fragmentary, part sectional and part elevational view of a modified form of the invention as shown in Fig. 1, insofar as a portion only of said machine is concerned; and, Fig. 13 is a perspective view of the portion shown in Fig. 12.

Fig. 14 is a cross sectional view of the weather strip when a liquid plastic only has been applied to the marginal portions of the latter without a stiffener.

Fig. 15 is a cross sectional view of a weather strip having a filler of sponge rubber in a part of the tongue.

Figs. 16, 17 are, respectively, cross sectional views similar to that of Fig. 5 in which sponge rubber is employed as a stiffener and adhesive for forming the rib and part of the tongue of the weather strip.

In the manufacture of the weather strip according to one form of this invention, the tape 1 represents a strip of cloth fabric, usually of cotton, of uniform width, and 2 is a coil or uncured sponge rubber, and 3 represents a strip of paper.

In actual practice, the method comprises supporting a length of uncured sponge rubber 2 on or against one side of tape 1 extending longitudinally of the latter and preferably to one side of the center of said tape so that the portion 4 of the tape at one side of the length of said rubber is narrower than the portion 5 of the other side thereof (Fig. 1). At the same time a strip 3 of plastic impregnated material, which may be of paper, is positioned alongside the length 2 of rubber and parallel with said tape 1 and length 2.

The tape 1, length of rubber 2, and strip 3 may then be moved together longitudinally thereof along a path of travel, it being understood that the exact positioning of the tape 1, strip 3, and rubber 2 in their side by side longitudinally extending positions may be done as the three are moved along said path.

During the above movement, the portions 4, 5 of the tape 1 are progressively moved around the rubber to opposed relation as seen in Fig. 3, and at the same time the plastic coated and impregnated strip 3 (which plastic is preferably an aqueous polyvinyl acetate emulsion from which the water has been quickly evaporated) is positioned between the opposed portions 4, 5 with the flat sides in opposed relation thereto. Movement along said path is continuous during the above steps.

As the tape 1, strip 3, and rubber 2 continue their movement along their path, a marginal portion 6 of the paper strip is bent at right angles to the remainder thereof, and the portion 5 of tape 1 is bent along a line opposite said portion 6 to form a recess 7 extending longitudinally of portion 5, and which recess opens toward the portion 6 of the paper (Fig. 4).

The portions 4, 5 of the tape 1 are then brought together to form a continuous tongue, generally designated 8 (Fig. 14) of uniform width projecting laterally from the rubber length 2. The marginal portion 6 of the paper strip 3 is positioned in recess 7 between the doubled over part of the portion 5 and is in engagement with the sides 9 of said portion (Fig. 5) to form a rib 10 projecting laterally outwardly of tongue 8 and extending the full length of the weather proofing strip.

This rib 10 projects substantially at right angles to the tongue 8, and the outer edges of the portions 4, 5 are substantially even with each other after the rib 10 is formed.

Sufficient heat is then applied to the tape 1, rubber 2, and strip 3 to vulcanize and "blow" the rubber so that the latter snugly fills the portion of the tape surrounding it as well as vulcanizing the rubber to the tape 1, and at the same time the marginal portions 4, 5 are bonded together by the plastic as well as bonding sides 9 together, with the paper interposed between said marginal portions and between said sides 9.

The conventional heating time and temperature for vulcanization is followed, such as from, say, about three minutes at about 200° F. up, according to the accelerator employed, but the temperature does not normally exceed 300° F., which is high. The polyvinyl acetate may be of the type known under the trade name of "Walpol," but others are suitable, the requirement being that the bonding be permanent under the temperature and weather conditions encountered in actual use of the weather strip, and that the tongue 8 and rib 10 have sufficient stiffness to retain their angular relationship when the weather strip is bent in applying it to a door frame.

After the rubber is cured (and it assumes a cylindrical form when cured, as seen in Fig. 14) and after the tongue 8 and rib 10 are formed, the product is finished insofar as its shape is concerned, but it is thereafter preferably cooled under tension such as by a longitudinal pulling tension after the sides 4, 5 and 9 are pressed tightly together by any suitable means such as by ironing rollers or the like. This positively insures good adhesion between said sides.

The step of inserting the plastic impregnated paper strip may be omitted in some instances where the desired stiffness in the tongue 8 and rib 10 may be otherwise obtained so that the angular relationship between the rib and tongue is held during installation of the weather stripping. However, the use of the paper or similar carrier for the plastic enables the plastic to be applied without the necessity for applying the plastic directly to the tape 1.

The aforesaid method, where the paper 3 may be omitted, is the same as described except that the plastic would be applied to the marginal portions 4 and 5 (Fig. 13) by transfer rollers 11, 12 from a main pick up roller 13 that has its lower side immersed in the plastic material 14. The roller 11 may be in two sections, one being narrow for plastic to be applied to the narrow marginal portion 4 and the other being wider for applying it to the wider portion 5 of the cloth tape.

Referring to Fig. 1, the tape 1 may be supported in a roll 16 and the uncured sponge rubber 2 drawn over the tape as the latter is unwound from the roll. In actual practice this tape may be approximately three inches in width and the uncured sponge rubber approximately three-eighths of an inch in diameter. These specifications, as well as other dimensions that may be given, are not to be taken as being restrictive of the invention since they are merely concrete examples of a one commercial product that is satisfactory.

The paper strip 3 may be of one hundred pound kraft paper that is one-half inch wide in the case of the three inch strip 1 being used. This paper may be carried on a roll 17 and taken from said roll through a bath 18 of said aqueous polyvinyl acetate emulsion and then pass through a heating chamber 89 where the water in the emulsion is evaporated.

The tape 1, rubber 2, and paper strip 3 may be supported on the flat surface of a support 88 and a positioner 19 over said support is formed with sides 20 (Fig. 2) between which the tape 1 is moved.

A bridge 21 extending between the upper ends of said sides is formed with a pair of downwardly extending, spaced projections 22 between which the length of rubber 2 passes and by which it is positioned on the tape 1. Opposedly opening recesses 23 at the upper ends of projections 22 are adapted to receive the longitudinally extending marginal portions of the strip 3 for positioning said strip directly over the length of rubber 2.

Beyond said positioner 19 in the direction of travel of tape 1, rubber 2 and strip 3, is a forming die 24 (Fig. 3) that is found with a through opening at its lower end through which the rubber 3 is adapted to pass, and upwardly extending slots 26, 27 opening into the opening 25 at their lower ends provide guide slots for the marginal portions 4, 5 of the tape 1. These slots guide the said marginal portions to opposed relation extending upwardly from opposite sides of the rubber 3. The portion of the die 24 between said slots 26, 27 is formed with a narrow, flat sided opening 28 that is spaced above opening 25 and through which the strip of paper 3 is adapted to extend.

The slots 26, 27 and the opening 28 may, if desired, be generally horizontally disposed at the entrance ends thereof (side of die facing the positioner) and progressively turn to vertically extending position in the direction of travel of the tape and strip 3, thus functioning in a manner similar to the folding shoes in conventional folding and wrapping machines for folding paper that is being moved along a path of travel. In the form shown in Fig. 3, the movement of the marginal portions 4, 5 of tape 1 may be directly formed by the die and the opening 26 in said die is nearer vertically disposed than horizontally, but it is inclined relative to vertical.

A second and third die 30, 31 may be positioned in line with the positioner 19 and die 24. Die 30 (Fig. 4) provides an opening 32 for the passage of the rubber 2, which is substantially larger than the opening 25 in die 24, and upwardly extending slots 33, 34 extending upwardly from opening 32 are substantially wider than slots 26, 27.

The inner side of the slot 34 is formed with an outwardly projecting horizontally extending short rib 35. Thus as the marginal portion 5 of the tape 1 is moved over said rib, it will force the said marginal portion outwardly to form the inwardly directed recess 7 in said marginal portion.

The portion 37 of the die between slots 33, 34 is formed with a reversed L shaped opening 38 (as seen in Fig. 4) for the strip 3, with the base 39 of the reversed L at the same level as the rib 35. Thus the paper 3 is bent to conform to the shape of the opening 38 and is formed with a horizontal leg 6 that will enter the recess 7 after the strip 3 moves out of the die 30.

After the tape 1, rubber 2, and strip 3 move out of the die 30 (in a direction from right to left as seen in Fig. 1) these three elements enter die 31, which die in turn has a single vertical slot 41 opening centrally into a cylindrical lower opening 42 for rubber 2 and the portion of tape 1 extending around it. A recess 43 opens into slot 41 at the same level as rib 35 of Fig. 4.

This recess 43 is adapted to receive the sides 9 of the part of portion 5 that is folded on itself with the base 6 of the reverse L of strip 3 between said sides 9. Sides 9 and base 6, and the marginal portion 4 of tape 1, and remainder of marginal portion 5 are moved into close engagement by the die 31. However, the rubber 2 does not fill out the part of the tape 1 that surrounds it, as seen in Fig. 5.

The next element, from right to left in the machine, is the mold that applies the necessary heat to the rubber and plastic to bond together the portions that are in engagement with the strip 3 and to vulcanize the rubber 2 as well as to vulcanize said rubber to the tape 1.

This mold, as seen in Fig. 6, may have an upper part 45 and a lower part 46. These are elongated horizontally and are hinged together at 47 and they respectively carry longitudinally extending heating elements 48, 48A for heating them.

The lower mold 46 is formed with a horizontally elongated passageway 49 the same size as opening 42 (Fig. 5), and when the upper and lower molds are together, a single slot 50 corresponding to slot 41 opens into the passageway 49, and a recess 51 opens laterally into slot 50 the same as recess 43 opens into slot 41. The line of division between the molds is preferably at the level of the center of recess 51 (Fig. 6).

The receiving end of the mold is adjacent to the die 31 and the opposite end is the discharge end.

Adjacent to the discharge end is a pair of idler ironing rollers 52, 53 that are preferably rotatable about vertical axes. The roller 52 is supported for rotation in a bearing 54 that is yieldably urged toward roller 53 by a spring 55 (Figs. 7, 8).

Rollers 52, 53 have peripheral, radially outwardly opening, substantially semi-cylindrical recesses 57, 58 formed therein that snugly receive and engage the outer sides of the cylindrical lower portion of the weather strip in which the rubber 2 is enclosed.

The roller 52 is also formed with a flat outer peripheral surface 59 above the recess 58 and the roller 53 is formed with a similar surface 60. An outwardly opening annular groove 61 in the flat surface 60 corresponds in contour to the outer surface of the rib 10 in the tongue 8 of the weather strip, and in operation the tongue 8 passes between the flat surfaces 59, 60 of rollers with the rib 10 extending into groove or recess 61 in roller 53 while the cured rubber 2 in its enclosing portion of tape 1 is engaged in the recesses 57, 58. The shaft supporting the roller 53 is preferably rigidly supported, hence yieldable pressure on the several parts of the weather strip is placed thereon by the roller 52 which is yieldably urged toward roller 53.

Sufficient plastic from the carrier permeates the portion of the tongue 8 between the rib 10 and the rubber core 2 to effect a bonding between the sides of the tape forming said portion, and the rollers squeeze the said sides of the tape together and to the paper strip to insure said bonding.

An open air space or gap exists between the ironing rollers 52, 53, and a pair of drive rollers 63, 64 (Figs. 1, 9, 10). These rollers correspond generally to rollers 52, 53, except that they are preferably larger in diameter and do not have the semi-cylindrical recesses for the enclosed rubber portion of the weather strip. Instead, the latter portion is exposed. Also, the flat peripheral outer surfaces of roller 64, which has a groove 65 formed therein, are knurled (Fig. 10) or roughened to provide for a firm frictional grip on the side of the tongue 8 that it engages.

The shaft 66 that supports roller 64 may be driven by a motor 67 through a conventional gear box 68 that is operatively connected with the motor by a belt or chain 69 (Fig. 1), and the speed at which the drive wheel or roller 64 is operated may vary according to the time required to effect the vulcanization of the rubber and cooling under the tension that exists by virtue of the fact that the drive roller 64, in combination with roller 63 (which is yieldably urged toward roller 64) pulls the weather strip through the curing mold and the several dies. Ordinarily a rate of movement of two to four feet a minute where the molds are about twenty feet long is adequate, and in the absence of artificial cooling or by a forced draft of air over the tensioned exposed length, a gap of about six to eight feet is adequate for cooling.

After the weather strip passes the rollers 63, 64 it is completed and ready for cutting to the desired lengths for shipment.

In Figs. 12, 13 apparatus is shown in which the plastic may be directly applied to the marginal portions of the tape instead of being applied by the carrier paper. Of course, in this method the stiffness that is contributed by the paper strip is absent. The heater 75 (Fig. 12) is the equivalent of the heating means 89 of Fig. 1 only the tape passes through this heater to evaporate the water from the plastic instead of the paper.

Fig. 11 illustrates the reason for the particular shape of weather stripping that is employed. In this view the rib 10 normally fits against and follows the flange or ridge 76 along the door opening and is positioned between clips 77 and said flange. Some clips positively clamp on to the tongue outwardly of rib 10. If the rib 10 and tongue 8 lack sufficient rigidity to hold the weather strip in position, it is of no value, and if the rib 10 should materially change its angular relation to tongue 8 in bending the same to follow curved contours, the difficulty of installing the weather strip would be too great for commercial use. However, the tongue 8 and rib 10 must have sufficient flexibility to readily follow the desired curved outlines of a door opening.

The weather strip of Fig. 15 may be made similar to that of Fig. 6 except that sponge rubber is used instead of paper and the mold, halves generally designated 80, are formed at 81 to provide sufficient space for a filler of sponge rubber 82. Also the mold is formed so that the rib 83 alongside the tongue is generally in the form of a tooth having a surface 84 that faces the main cylindrical body 85 of the weather strip, and that is perpendicular to the tongue, while the opposite side 86 of the rib is slanted to brace the rib against flexing toward or away from said cylindrical body.

Outwardly of the rib 83, the sides of the tape are plastic coated or impregnated, so as to adhere to each other in the same manner as in Fig. 14. As stated, the mold is formed to produce the space and form to provide the weather strip structure as seen in Fig. 15.

Figs. 16, 17 are similar to Fig. 5, but uncured sponge rubber 88 is positioned opposite the point where the rib is formed, and when the vulcanizing heat is applied, this rubber 88, as well as the main length of rubber 89 will expand, as seen in Fig. 15 to fill out the tape and mold, and the rubber will, of course, tightly adhere to the tape.

In Fig. 16 the added rubber 88 is merely a length of rubber separate from the main body 89 but in Fig. 17 this added rubber is a tongue 90 integral with the main body.

The main body 89 could, of course, be made sufficiently large to expand into the tongue and rib portion of the weather strip by suitable venting of the mold to provide release of air in the mold as the rubber expanded.

The outer portion 91 of the tongue has the plastic applied thereto in a manner similar to that shown in Fig. 13 since the marginal portions of the tape forming this portion are adhered together.

The form of invention shown in Fig. 15 and as described is, in many ways, preferable to the other forms illustrated although it may be slightly more costly than said other forms.

Inasmuch as the rubber is more resilient than the form that employs paper, the weather strip can be wound directly onto a drum after the rubber is cured.

Where the weather strip is used along relatively sharp curves, the tongue and rib are cut to the main body of the weather strip along spaced lines to enable the tongue to open along said lines along the curve. It is easy and simple to cut the tongue of the weather strip hereinabove described, since there are no wires or the like incorporated in the tongue.

The detached description of the invention is not neccessarily intended to be restrictive of the invention but is merely illustrative of the preferred forms.

I claim:

1. A weather strip adapted for securement around a door opening in a vehicle body comprising: an elongated cylindrical body of soft rubber of uniform diameter having a tongue of the same material integral therewith projecting from one side of said body radially thereof and extending longitudinally thereof, a rib of the same material as that of said body and said tongue projecting laterally from one side of the latter and spaced from said body and extending longitudinally thereof, the terminating outer edge of said rib and the outer surface of said rib relative to said body, being substantially coterminous, a cover comprising a fabric strip of soft flexible fabric of uniform width substantially enclosing said body, tongue and rib and bonded thereto and conforming to the cross sectional contour thereof, said strip having a marginal portion integral therewith projecting outwardly of said tongue and rib radially of said body and in substantially the same plane as the plane in which said tongue is disposed providing an extension of said rib that is of the fabric strip only and that is relatively thin compared with said rib, and that is adapted to be engaged by clips around such door opening, said marginal portion being relatively stiff with respect to the portion of said strip covering said body, tongue and rib.

2. A weather strip adapted for securement around a door opening in a vehicle body comprising: an elongated cylindrical body of soft rubber of uniform diameter having a tongue of the same material integral therewith projecting from one side of said body radially thereof and extending longitudinally thereof, a rib of the same material as that of said body and said tongue projecting laterally from one side of the latter and spaced from said body and extending longitudinally thereof, the terminating outer edge of said rib and the outer surface of said rib relative to said body, being substantially coterminous, a cover comprising a fabric strip of soft flexible fabric of uniform width substantially enclosing said body, tongue and rib and bonded thereto and conforming to the cross sectional contour thereof, said strip having a marginal portion integral therewith projecting outwardly of said tongue and rib radially of said body and in substantially the same plane as the plane in which said tongue is disposed providing an extension of said rib that is relatively thin compared with said rib, and that is adapted to be engaged by clips around such door opening, said marginal portion being relatively stiff with respect to the portion of said strip covering said body, tongue and rib, said strip having an opposite marginal portion integral therewith along its edge opposite to said one marginal portion, said opposite marginal portion being in lapping relation to said one marginal portion against and bonded therewith whereby said extension of said rib comprises two layers of said strip, and means inseparably incorporated in said one marginal portion and in said other marginal portion bonding them together and stiffening them.

References Cited in the file of this patent

UNITED STATES PATENTS

| | | |
|---|---|---|
| 1,431,256 | Rissmann | Oct. 10, 1922 |
| 1,581,777 | Beynon | Apr. 20, 1926 |
| 1,742,195 | Bosley | Jan. 7, 1930 |
| 1,837,443 | Jarrow | Dec. 22, 1931 |
| 1,893,399 | Clark | Jan. 3, 1933 |
| 2,004,413 | Main | June 11, 1935 |
| 2,228,368 | Schlegel et al. | Jan. 14, 1941 |
| 2,419,322 | Matheny | Apr. 22, 1947 |
| 2,459,120 | Spraragen | Jan. 11, 1949 |
| 2,595,421 | Spalding | May 6, 1952 |
| 2,655,698 | Chalik et al. | Oct. 20, 1953 |
| 2,659,117 | Spraragen | Nov. 17, 1953 |
| 2,760,897 | Owens | Aug. 28, 1956 |

FOREIGN PATENTS

| | | |
|---|---|---|
| 820,238 | France | July 26, 1937 |
| 571,165 | Great Britain | Aug. 9, 1945 |
| 138,208 | Australia | Aug. 7, 1950 |